(12) United States Patent
Foster

(10) Patent No.: US 8,074,923 B2
(45) Date of Patent: Dec. 13, 2011

(54) ENGINE MOUNTING APPARATUS

(75) Inventor: Lawrence David Foster, Toulouse (FR)

(73) Assignee: Rolls-Royce PLC (GB)

( * ) Notice: Subject to any disclaimer, the term of this patent is extended or adjusted under 35 U.S.C. 154(b) by 440 days.

(21) Appl. No.: 12/419,389

(22) Filed: Apr. 7, 2009

(65) Prior Publication Data
US 2009/0266933 A1     Oct. 29, 2009

(30) Foreign Application Priority Data
Apr. 24, 2008  (GB) .................................. 0807444.5

(51) Int. Cl.
*B64D 27/12*        (2006.01)

(52) U.S. Cl. .......................................... 244/54; 248/554

(58) Field of Classification Search .................... 244/54; 248/554, 557
See application file for complete search history.

(56) References Cited

U.S. PATENT DOCUMENTS

| | | | |
|---|---|---|---|
| 5,275,357 A * | 1/1994 | Seelen et al. ...................... | 244/54 |
| 6,059,227 A * | 5/2000 | Le Blaye et al. ................. | 244/54 |
| 6,341,746 B1 * | 1/2002 | Pascal et al. ..................... | 244/54 |
| 2003/0025033 A1 * | 2/2003 | Levert et al. ..................... | 244/54 |
| 2003/0066928 A1 * | 4/2003 | Brefort et al. ................... | 244/54 |
| 2007/0138337 A1 | 6/2007 | Audart-Noel et al. | |

FOREIGN PATENT DOCUMENTS

| | | |
|---|---|---|
| EP | 0564126 A1 | 10/1993 |
| EP | 1129942 A3 | 12/2001 |

* cited by examiner

*Primary Examiner* — Tien Dinh
*Assistant Examiner* — Michael Kreiner
(74) *Attorney, Agent, or Firm* — McCormick, Paulding & Huber LLP

(57) ABSTRACT

An engine mounting apparatus for attaching an engine to a suspension pylon includes a mounting block, first and second links connectable between the engine and the mount block and first and second fixings connectable between the suspension pylon and the mount block. The apparatus further has a catcher link, located between the first and second links, that is connectable to the engine at a first end and to the suspension pylon at a second end via a third fixing with a clearance between the catcher link and the engine such that no load is transferred between the engine and the suspension pylon in normal operation. The apparatus also has a catcher fixing between the mount block and the catcher link, the catcher fixing having a clearance with respect to the mount block such that no load is transferred between the mount block and the catcher link in normal operation.

7 Claims, 3 Drawing Sheets

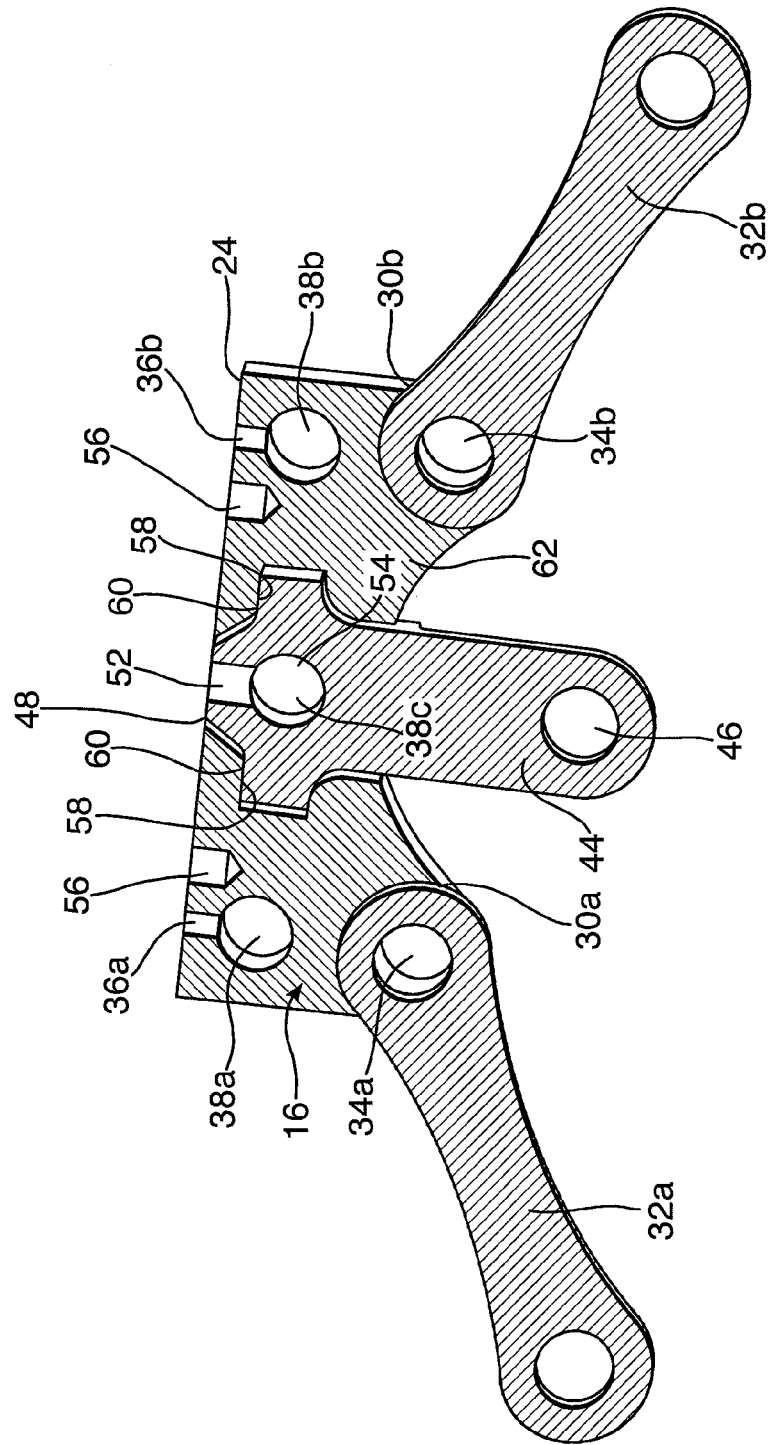

ENGINE MOUNTING APPARATUS

CROSS REFERENCE TO RELATED APPLICATION

This application is entitled to the benefit of British Patent Application No. GB 0807444.5 filed on Apr. 24, 2008.

FIELD OF THE INVENTION

The present invention relates to an engine mounting apparatus and is particularly concerned with a mounting apparatus for attaching an aircraft engine to an aircraft pylon.

BACKGROUND OF THE INVENTION

It is conventional when mounting an engine on an aircraft, whether under a wing or against the fuselage, to provide a front and a rear mounting apparatus with respect to the engine. Where the engine is a gas turbine engine, the front mounting is generally provided in the vicinity of the compressors and the rear mounting is generally provided in the vicinity of the turbines. However, other apparatuses are possible. The engine is suspended under the wings or from the tail of an aircraft by front and rear engine mounting apparatuses.

U.S. Pat. No. 6,059,227 discloses a mounting apparatus that comprises a main attachment structure, or mount block, having two load transfer links interconnecting the engine and the main attachment structure. Four bolts are provided to interconnect the aircraft pylon and the main attachment structure and thereby transfer the loads from the engine into the pylon. A standby attachment structure is provided as a fail-safe mechanism. It comprises a protrusion extending from the pylon and is arranged to sit, in use, through a slot in the main attachment structure. When it is located through the slot a pin can be inserted through an aperture in the protrusion so that the pylon and main attachment structure cannot be separated. There is a clearance around the pin in the aperture so that no load is transferred during normal usage. However, if one of the two load transfer links fails, the clearance is taken up and the load is transferred through the standby attachment structure.

One disadvantage of this apparatus is that the pin is obscured by the surrounding components. This means that it is prone to being overlooked during inspection and maintenance of the engine and mounting or assembly and / or disassembly of the engine mounting. If the pin is not inserted through the aperture in the protrusion during mounting of the engine to the aircraft pylon there is no fail-safe mechanism in the event of failure of one of the load transfer links. If the pin is not removed before the bolts during dismounting of the engine, the full weight of the engine is inadvertently transferred through the pin and the standby attachment apparatus, which may stress and damage the pin thereby requiring its replacement for full safety.

Another disadvantage of this apparatus is that the fail-safe mechanism is only effective in the event of a failure of one of the load transfer links. In the event of the failure of the main attachment structure there is no alternative load path. This is likely to result in one or both of the load transfer links being inoperative and may result in the engine becoming detached from the pylon.

A further conventional apparatus is disclosed in U.S. Pat. No. 5,275,357, which has a platform, or mount block, having three links connecting it to the engine and bolts to connect it to the aircraft pylon. Two of the links are load transfer links that are connected at one end to the engine, at the other end to the platform and at an intermediate position to the platform with a sliding connection to allow thermal expansion between the components. The third, fail-safe link is connected to the platform at one end and to the engine at the other by a pin having a clearance. Thus, during normal operation the third link is unloaded. In the event of failure of one of the two load transfer links, the clearance is taken up and the load is transferred through the third, fail-safe link.

This apparatus also is unable to provide a fail-safe mechanism in the event of failure of the platform. As with U.S. Pat. No. 6,059,227 one or both of the load transfer links may become inoperative and the engine may become detached from the pylon.

SUMMARY OF THE INVENTION

The present invention seeks to provide a novel engine mounting apparatus that addresses the aforementioned problems.

Accordingly the present invention provides an engine mounting apparatus for attaching an engine to a suspension pylon includes a mounting block, first and second links connectable between the engine and the mount block and first and second fixings connectable between the suspension pylon and the mount block to transfer loads between the engine and the suspension pylon. The apparatus further has a catcher link, located between the first and second links, that is connectable to the engine at a first end and to the suspension pylon at a second end via a third fixing, a clearance being defined between the catcher link and the engine such that no load is transferred between the engine and the suspension pylon in normal operation. The apparatus also has a catcher fixing between the mount block and the catcher link, the catcher fixing having a clearance with respect to the mount block such that no load is transferred between the mount block and the catcher link in normal operation.

Preferably the catcher link extends between the suspension pylon and the engine and passes through the mount block.

Preferably the catcher link and first and second links are in substantially the same axial plane.

Preferably the mount block has stop faces and the catcher link includes shoulders which engage the stop faces.

Preferably the engine is an aircraft engine and the suspension pylon is an aircraft pylon.

Preferably the first, second and third fixings include bolts.

Preferably the catcher fixing is a barrel nut.

BRIEF DESCRIPTION OF THE DRAWINGS

The present invention will be more fully described by way of example with reference to the accompanying drawings, in which:

FIG. 3 is a sectional side view through the front engine mounting apparatus of FIG. 2.

DETAILED DESCRIPTION OF THE PREFERRED EMBODIMENTS

Figure 1:
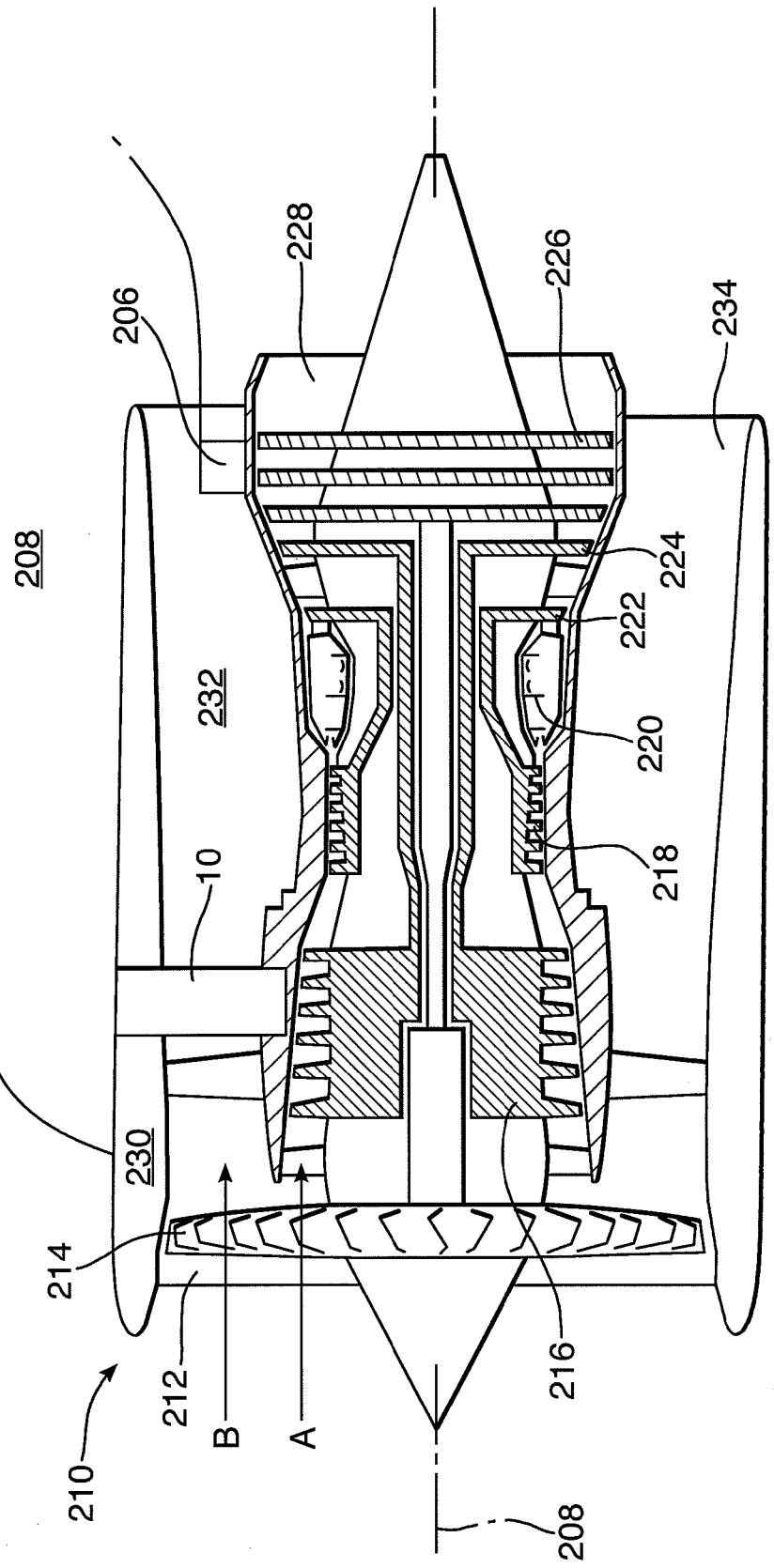
FIG. 1 is a sectional side view of a gas turbine engine having a conventional rear engine mounting apparatus.

A gas turbine engine 210 is shown in schematic section in FIG. 1 and comprises a main rotational axis 208 an air intake 212 and a propulsive fan 214 that generates two airflows A and B. The gas turbine engine 210 comprises, in axial flow A, an intermediate pressure compressor 216, a high pressure compressor 218, a combustor 220, a high pressure turbine 222, an intermediate pressure turbine 224, a low pressure turbine 226 and an exhaust nozzle 228. A nacelle 230 surrounds the gas turbine engine 210 and defines, in axial flow B, a bypass duct 232 between the air intake 212 and an exhaust nozzle 234. A front engine mounting apparatus 10 (front in the sense of airflows A and B) is shown in the vicinity of the intermediate compressor 216. A rear engine mounting apparatus 206 may also be provided, generally in the vicinity of the turbines 222, 224, 226. Both engine mounting apparatuses are connectable to the aircraft pylon 208 to transfer the engine loads to the aircraft. The front engine mounting apparatus 10 is located at a radially outer extent of the engine 210, preferably at top dead centre. For the purposes of the following description, this will be taken to be vertically above the engine although it should be understood that the engine 210 may be hung at an angle to the vertical.

Figure 2:
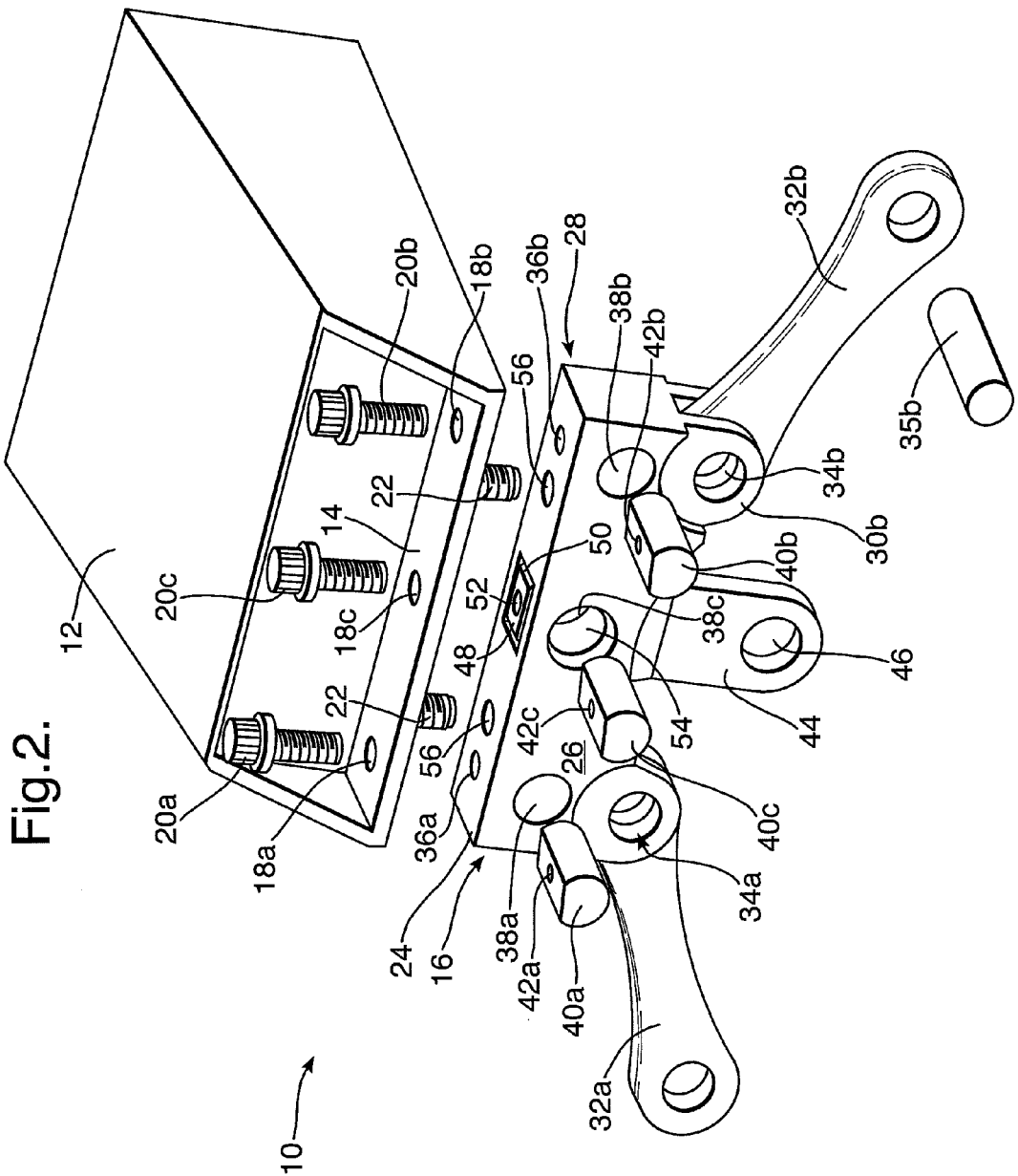
FIG. 2 is an exploded perspective view of an aircraft pylon and a front engine mounting apparatus according to the present invention.

An exemplary embodiment of the front engine mounting apparatus 10 of the present invention is shown in FIG. 2 in exploded view. Part of an aircraft pylon 12 is shown, having a platform area 14 extending from a front edge of the pylon 12 to interface to a mount block 16. Apertures 18 are defined through the platform 14 to receive attachment bolts 20 therethrough for connection with the mount block 16. Shear pins 22 are provided extending from the lower face of the platform 14 to engage the mount block 16.

The mount block 16 is yoke shaped in lateral cross-section, but may be any suitable shape, and has a substantially planar upper surface 24 at its radially outer extent that, in use, interfaces with the platform 14 of the aircraft pylon 12. The mount block 16 includes an axially front face 26 and an axially rear face 28. The mount block 16 is wider in the lateral direction than its dimension in the axial direction. The mount block 16 is arranged such that a radial line extending between the main rotational axis 208 and the pylon 12 passes through a centre of the mount block 16.

The mount block 16 has, at its lower (radially inner) extent, first and second devises 30a, 30b with an aperture 34a, 34b through each for attachment of the engine. The devises 30a, 30b are preferably spaced apart and located towards the lateral edges of the mount block 16. First and second load transfer links 32a, 32b are interconnected between the engine and the first and second devises 30a, 30b respectively. A locking pin (not shown) is used to secure the first load transfer link 32a within the aperture 34a in the first clevis 30a and similarly for the second load transfer link 32b. The connection of the load transfer links 32a, 32b to the engine is preferably by a similar clevis apparatus. Pin 35b is inserted through apertures in the engine clevis and load transfer link 32b (shown in broken lines) and a similar pin (not shown) is used for the other load transfer link 32a. The advantage of providing clevis connections is that some relative movement can be accommodated between the engine and the mount block 16 both whilst originally mounting the engine and to allow for different thermal expansion and contraction of the components in service.

The mount block 16 is connected to the pylon 12 by the attachment bolts 20 mentioned above. The upper surface 24 of the mount block 16 includes apertures 36a, 36b extending parallel to the radial line between the engine 210 and pylon 12. These radial apertures 36a, 36b are aligned with apertures 18a, 18b in the platform 14 of the pylon 12 when the mount block 16 and pylon 12 are correctly aligned together. Attachment bolts 20a, 20b are inserted through the apertures 18a, 18b in the platform 14 and thence through the radial apertures 36a, 36b in the upper surface 24 of the mount block 16. Axial apertures 38a, 38b are provided through the mount block 16 between the front and rear faces 26, 28. The axial apertures 38a, 38b are arranged to intersect with the radial apertures 36a, 36b. Barrel nuts 40a, 40b are provided that, in use, are located within the axial apertures 38a, 38b. The attachment bolts 20a, 20b are seated into recesses 42a, 42b in the barrel nuts 40a, 40b, for example by a screw thread (not shown) to connect the mount block 16 to the platform 14 of the pylon 12.

The upper surface 24 of the mount block 16 includes two apertures 56 that are positioned to receive and engage, in use, the shear pins 22. The shear pins 22 serve the dual purpose of locating the mount block 16 with respect to the pylon 12 and of taking the lateral loads, along with any axial shear loads.

FIG. 2 also shows the fail-safe mechanism of the engine mounting apparatus 10 of the present invention. A catcher link 44, which is generally elongate, is located between the load transfer links 32a, 32b to interconnect the engine 210 and the pylon 12. Preferably it includes an axial aperture 46 in one end to slot within a clevis apparatus on the engine 210; it is secured via a locking pin (not shown). At the distal (radially outer) end the catcher link 44 includes a planar surface 48 that is arranged to fit within an aperture 50 in the upper surface 24 of the mount block 16 so that the planar surface 48 is coplanar with the upper surface 24 of the mount block 16. A radial aperture 52 extends through the planar surface 48 of the catcher link 44 for receiving, in use, a third attachment bolt 20c. There is further provided an axial aperture 54 towards the planar surface 48 of the catcher link 44 that is positioned to be coaxial with a third axial aperture 38c through the front and rear faces 26, 28 of the mount block 16, when the catcher link 44 is seated for use. A third barrel nut 40c, having a recess 42c in its upper surface, is inserted through the coaxial axial apertures 38c, 54. The recess 42c is arranged so that the third attachment bolt 20c can be inserted through the aperture 18c in the platform 14 of the pylon 12, through the radial aperture 52 in the planar surface 48 of the catcher link 44 and into the recess 42c in the barrel nut 40c to lock the catcher link to the pylon.

A pre-determined clearance is defined between the axial aperture 46 and its associated pin so that no load is transferred during normal in-service operation of the engine mounting apparatus 10. A further pre-determined clearance is defined between barrel nut 40c and the axial aperture 38c to ensure that the fail-safe load path through the catcher link 44 is independent of the normal load path through the mount block 16.

FIG. 3 depicts an axial section through the mount block 16 of the present invention at the forward faces of the coplanar load transfer links 32a, 32b and the catcher link 44. The mount block 16 defines an internal recess 62 in the form of a clevis, or pair of walls, in which the catcher link 44 is received. As can be seen in this figure, the catcher link 44 has a more complex geometry than being simply elongate. At a first end, towards its planar surface 48, the catcher link 44 includes shoulders 58 that engage stop faces 60 formed by the geometry of the internal recess 62. In use, tightening the third attachment bolt 20c into the recess 42c of the third barrel nut 40c clamps the shoulders 58 of the catcher link 44 against the stop faces 60 of the internal recess 62 of the mount block 16. This has a number of advantages including that it provides a third bolt 20c clamping the mount block 16 in normal operation, thereby reducing the necessary pre-load on the attachment bolts 20 and resisting the fatigue loads. It also prevents chatter and wear of the catcher link 44 in normal (unloaded) operation. Finally, the engagement of the shoulders 58 and stop faces 60 also provides heeling surfaces to react lateral loads at the connection between the catcher link 44 and the engine 210.

In the event of a failure of one of the load transfer links 32a, 32b, where load can no longer be carried by this link it must be transferred between the engine 210 and the pylon 12 via alternative routes. For example, if the second load transfer link 32b fails by a crack or break propagating across its major axis, the load can no longer be transferred from the engine 210 through the second load transfer link 32b to the mount block 16. Instead, the clearance around the third barrel nut 40c is taken up and load is transferred from the engine 210 through the catcher link 44 to the mount block 16, as well as through the first load transfer link 32a. The load is transferred from the mount block 16 to the pylon 12 by virtue of all three attachment bolts 20. Thus the disruption caused by the failure of the second load transfer link 32b is minimised by the provision of an alternative load path through the catcher link 44, which only transfers engine loads after a failure. The alternative load transfer path is closely physically located with the normal load transfer path so that as few components as possible experience a change in loading.

A second failure mode can occur if a crack or break propagates through the mount block 16. The alternate load path will be described in relation to a radially propagated break of the mount block 16 passing between the second radial aperture 36b and the shear pin aperture 56 at the upper surface 24, and between the second clevis 30b and the internal recess 62 at the lower extent of the mount block 16. However, other failure locations are equally compensated by the apparatus herein described.

In such a failure mode the load path through the second load transfer link 32b, mount block 16 and second attachment bolt 20b becomes ineffective at transferring the load. Hence the clearance around the pin through the axial aperture 46 is taken up and the load transferred from the engine 210 through the catcher link 44 to the platform 14 of the pylon 12 via barrel nut 40c and bolt 20c, as well as through the first load transfer link 32a. From thence, the load is transferred to the pylon 12 by only the first and third attachment bolts 20a, 20c. The second attachment bolt 20b remains attached between the pylon 12 and the mount block 16, whilst the second load transfer link 32b remains attached to the engine 210 and to the mount block 16 via the second clevis apparatus 30b. This means that the section of the mount block 16 beyond the failure remains securely fixed to both the pylon 12 and the engine 210 and is not released as damaging debris.

Although the engine mounting apparatus 10 of the present invention has been described as a front engine mounting apparatus, it may equally be used as a rear mounting. It is preferable for the front engine mounting apparatus 10 to be located in the vicinity of the intermediate compressor 216 so that the front and rear mountings are axially spaced to reduce distortion moments. However, this location is a non-limiting example and other positions are contemplated to fall within the scope of the present invention.

Although the connections of the load transfer links 32a, 32b and the catcher link 44 to the engine 210 and the mount block 16 have been described as clevis apparatuses, other connection apparatuses are possible. For example, the clevis apparatuses may be reversed so that the pair of lugs is provided on the component described as having a single lug and vice versa. Alternatively both components may have pairs of lugs that interleave to form the connection or both components may have a single lug, which reduces the weight but does reduces some redundancy.

Although the axial apertures through the mount block 16 have been described as extending through the mount block 16 it is possible for the axial apertures to resemble recesses instead so that no aperture is visible on the rear face 28 of the mount block 16.

Although three attachment bolts 20 have been described with corresponding barrel nuts 42, more or fewer may be appropriate in other specific embodiments of the front engine mounting apparatus 10 of the present invention. Similarly, more or fewer than two shear pins 22 may be used.

The invention claimed is:

1. An engine mounting apparatus for attaching an engine to a suspension pylon comprising:
    a mount block,
    first and second links connectable between the engine and the mount block
    first and second fixings connectable between the suspension pylon and the mount block to transfer loads between the engine and the suspension pylon,
    a catcher link, located between the first and second links, that is connectable to the engine at a first end and to the suspension pylon at a second end via a third fixing, there being a clearance between the catcher link and the engine such that no load is transferred between the engine and the suspension pylon in normal operation, and
    a catcher fixing between the mount block and the catcher link, the catcher fixing having a clearance with respect to the mount block such that no load is transferred between the mount block and the catcher link in normal operation.

2. An engine mounting apparatus as claimed in claim 1 wherein the catcher link extends between the suspension pylon and the engine and passes through the mount block.

3. An engine mounting apparatus as claimed in claim 1 wherein the catcher link and first and second links are in substantially the same axial plane.

4. An engine mounting apparatus as claimed in claim 1 wherein the mount block comprises stop faces and the catcher link comprises shoulders which engage the stop faces.

5. An engine mounting apparatus as claimed in claim 1 wherein the engine mounting apparatus is connected to the engine and the suspension pylon, and wherein the engine is an aircraft engine and the suspension pylon is an aircraft pylon.

6. An engine mounting apparatus as claimed in claim 1 wherein the first, second and third fixings comprise bolts.

7. An engine mounting apparatus as claimed in claim 1 wherein the catcher fixing comprises a barrel nut.

* * * * *